(12) United States Patent
Tompkin et al.

(10) Patent No.: US 6,819,409 B1
(45) Date of Patent: Nov. 16, 2004

(54) SYSTEM FOR READING AN INFORMATION STRIP CONTAINING OPTICALLY CODED INFORMATION

(75) Inventors: Wayne Robert Tompkin, Baden (CH); René Staub, Cham (CH)

(73) Assignee: OVD Kinegram AG, Zug (CH)

( * ) Notice: Subject to any disclaimer, the term of this patent is extended or adjusted under 35 U.S.C. 154(b) by 0 days.

(21) Appl. No.: 09/958,282

(22) PCT Filed: Apr. 4, 2000

(86) PCT No.: PCT/EP00/02987

§ 371 (c)(1),
(2), (4) Date: Oct. 5, 2001

(87) PCT Pub. No.: WO00/62237

PCT Pub. Date: Oct. 19, 2000

(30) Foreign Application Priority Data

Apr. 8, 1999 (DE) .......................... 199 24 750

(51) Int. Cl.[7] .............................. G06K 9/74; G06K 7/08; H01J 5/16; G01N 21/86
(52) U.S. Cl. .................. 356/71; 250/226; 250/556; 250/559.09; 250/559.11; 235/449; 235/454; 283/82; 283/83; 283/85; 283/90; 283/91
(58) Field of Search ......................... 356/71; 250/226, 250/556, 559.07, 559.09, 559.11; 235/449, 454; 283/82, 83, 85, 90, 91

(56) References Cited

U.S. PATENT DOCUMENTS 4,211,918 A * 7/1980 Nyfeler et al. .............. 235/454
4,544,266 A * 10/1985 Antes ......................... 356/71
5,304,813 A * 4/1994 De Man ..................... 250/556
5,393,966 A * 2/1995 Gatto et al. ................ 235/440
5,498,879 A * 3/1996 De Man ..................... 250/556
5,591,952 A * 1/1997 Krichever et al. ...... 235/462.11
5,627,663 A 5/1997 Horan et al.
5,946,427 A 8/1999 Kanemitsu
6,496,251 B1 * 12/2002 Wunderer .................... 356/71

FOREIGN PATENT DOCUMENTS

| EP | 0 360 969 A1 | 4/1990 |
| EP | 0 537 431 A1 | 4/1993 |
| EP | 0 718 795 A1 | 6/1996 |
| JP | 8-163380 | 6/1996 |

* cited by examiner

Primary Examiner—Gregory J. Toatley, Jr.
Assistant Examiner—Roy M. Punnoose
(74) Attorney, Agent, or Firm—Hoffman & Baron, LLP

(57) ABSTRACT

A reading arrangement includes at least one linear detector arrangement which is arranged in parallel relationship above a reading plane and behind an optical imaging element and is oriented on to a reading region of the reading plane, lighting devices and an evaluation unit and serves for machine reading of an information strip with optically encoded information. The light which is scattered or diffracted out of the reading region in which the information strip to be read off by machine is disposed into the optical imaging element is so projected on to the photosensitive faces of the detector arrangement that an image of the reading region is formed. The detector arrangement produces two detector signals and from a comparison of the detector signals, the read information is determined and its authenticity verified.

19 Claims, 3 Drawing Sheets

SYSTEM FOR READING AN INFORMATION STRIP CONTAINING OPTICALLY CODED INFORMATION

BACKGROUND OF THE INVENTION

The invention relates to an arrangement for machine reading of information strips with optically encoded information.

Such reading arrangements are used for the machine checking of documents such as identity cards, credit and payment cards, passes, banknotes, stocks and shares and securities, valuable articles or products and the packaging thereof and so forth, which have an information strip with optically encoded information.

EP 0 718 795 A1 discloses a reading arrangement for information strips with optically encoded information. Optical markings are arranged on the information strip in bit lines, wherein at least two bit lines with an identical division into surface portions of equal size are required. Each surface portion is occupied for example by an optical diffraction element. The diffraction elements of the same bit line involve the same grating parameters (spatial frequency, profile shape, azimuth etc) and differ from the diffraction elements of the adjacent bit line. A respective surface portion from the one bit line forms, with the adjacent surface portion from another bit line, a bit pair representing an individual bit of the item of information. In the case of those information strips, after manufacture it is possible for an item of information to be individually written once, wherein in the operation of writing the information in one of the two surface portions of the bit pair, the optical characteristics of the surface portion are irreversibly modified. A number of embodiments of the information strips are described. Specific structures of the diffraction elements are known for example from WO 97/19821 and WO 98/10324.

It is also known (EP 0 883085 A1) for each surface portion of a single-line information strip to be made up from a plurality of partial surfaces which are occupied alternately by one of two different optical diffraction elements from the set a, b, c, d etc. The diffraction elements of one of the sets a, b, c, d etc involve the same grating parameters (spatial frequency, profile shape, azimuth etc) and differ from the diffraction elements of the other sets. Each surface portion differs from its two neighbours by virtue of the choice of the diffraction elements for the partial surfaces. The information of those information strips is the same in all and cannot be individually modified for each information strip.

A bar code which is made up from diffraction elements and a reader which is suitable for labels with such a bar code is described in EP 0 366 858 A1. The information content of that bar code cannot be individually modified.

The reading arrangements described in the quoted documents scan the information by means of a narrow light beam which is incident in perpendicular relationship on to the plane of the information carrier and observe the light which is diffracted at the diffraction elements of the information carrier, by means of photoelectric elements. Those reading arrangements suffer from the disadvantage that the light beam must be moved relative to the information carrier for scanning the information on the information strip.

Without an additional and expensive scanning track on the information carrier, in accordance with EP 0 718 795 A1 the speed of that relative movement must be uniform so that the information which is read off can be recognised.

The reader described in WO 98/55963, instead of the usual discrete photoelectric elements, also uses photodetector arrays which are also known by the name 'Charge Coupled Device' or CCD. An optical element converts the light emitted from a point source into a parallel light beam which is incident in perpendicular relationship on to the entire face with the optical-diffraction markings, the light beam illuminating at least the entire face with the optical-diffraction markings. The light diffracted at those markings is collected again by the optical element and focused in point form on the photodetector arrays. The reader manages without a relative movement between the incident light and the information strip, and it is substantially independent of the distance between the markings and the optical element. An embodiment can also tolerate azimuth errors. A limitation in terms of the scope of the information has to be accepted as a disadvantage.

SUMMARY OF THE INVENTION

The object of the present invention is that of providing a simple and inexpensive arrangement for the machine reading of information strips with optically encoded information, which detects the information with a high level of reliability.

In accordance with the invention the stated object is attained by the features recited in the characterising portion of claim 1. A reading arrangement includes at least one linear detector arrangement which is disposed parallel to a reading plane and behind an optical imaging element and which is directed on to a reading region of the reading plane, lighting devices and an evaluation unit, and serves for the machine reading of an information strip with optically encoded information, which is in the reading region. The light which is diffracted or scattered out of the reading region in which the information strip to be read off by machine is disposed into the optical imaging element is projected on to the photosensitive faces of the detector arrangement in such a way that an image of the reading region is formed. The reading region is laterally inclinedly lit by a respective one of the lighting devices. In a first reading phase the detector arrangement produces detector signals S(1) and in a second reading phase the detector signals S(2), wherein lighting directions α, β, and/or the quality of the light used for lighting the reading region are different in the reading phases. From a comparison of the detector signals S(1) and S(2), the information which is read off is determined and its authenticity verified.

Advantageous configurations of the invention are set forth in the appendant claims.

BRIEF DESCRIPTION OF THE DRAWINGS

Embodiments of the invention are described in greater detail hereinafter and illustrated in the drawing in which.

DESCRIPTION OF THE PREFERRED EMBODIMENTS

Figure 1A:
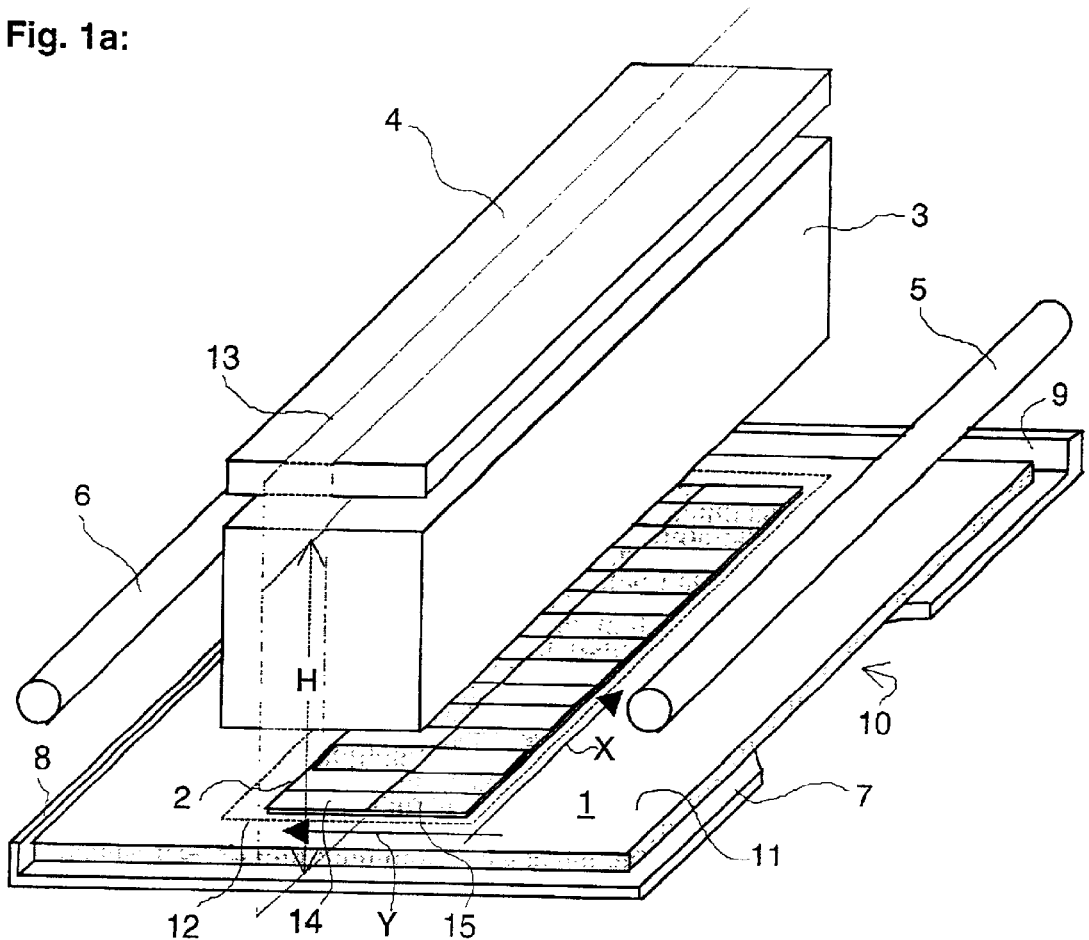
FIG. 1a shows an arrangement for the reading operation.

Referring to FIG. 1a, reference 1 denotes a document, reference 2 an information strip, reference 3 an optical imaging element, reference 4 a detector arrangement, reference 5 a first lighting device, reference 6 a second lighting device, reference 7 a reading plane, references 8 and 9 edge portions of the reading plane 7 and reference 10 an opening for easier removal of the read document 1. The document 1 lies on the reading plane 7 and on its front side 11 has the information strip 2. The edge portions 8 and 9 of the reading plane 7 position the document 1 in such a way that the information strip 2 comes to lie over its entire length completely within a strip-shaped reading region 12. For reasons of illustration in the drawing, the reading region 12 is bordered by a broken line. The reading region 12 is established by the imaging element 3 and/or the detector arrangement 4, as the region of the reading plane 7, the image of which is formed by the imaging element 3 on photosensitive faces of the detector arrangement 4. The reading region 12, the image of which is formed on the detector arrangement 4 by means of the imaging element 3, is smaller at least in its longitudinal direction than the photosensitive faces. A notional plane of symmetry 13 is parallel to an optical axis of the imaging element 3 and intersects the imaging element 3, the detector arrangement 4 and the reading region 12 centrally in the longitudinal direction. In an embodiment of the reading arrangement, the plane of symmetry 13 is perpendicular to the reading plane 7, while in another embodiment it is inclined. The document 1 is laid with the information strip 2 directed towards the imaging element 3 on the reading plane 7 and is so oriented by means of the edge portions 8, 9 that the information strip 2 is in the reading region 12. The spacing H between the photosensitive faces of the detector arrangement 4 and the reading region 12 is the spacing between the image and object planes of the imaging element 3.

The reading arrangement includes at least the optical imaging element 3, the detector arrangement 4, at least one lighting device 5, 6 and the reading plane 7. To make description easier herein, a right-angled coordinate system which is oriented on to the reading region 12 is used, in parallel relationship with the reading plane 7. The ordinate Y of the coordinate system is oriented parallel to the shorter side of the reading region 12 while the abscissa X is oriented parallel to the longitudinal side of the reading region 12.

A suitable form of imaging element 3 is an individual lens which is very expensive because of the size required, a field or panel with a plurality of small lenses of a diameter in the range of between 0.01 mm and 2 mm, or small cylindrical lenses with their axis parallel to the ordinate Y, or Fresnel lenses with the properties of the round lenses or the cylindrical lenses, wherein the field or panel involves at least the dimensions of the reading region 12. A bundle of optical waveguides can also be used as the imaging element 3, in particular such bundles with imaging properties such as for example the SELFOC® 'lens arrays' from Nippon Sheet Glass Co Ltd, Tokyo, Japan, are highly suitable.

The information strip 2 can be integrated directly into the document 1, for example in the case of documents 1 in card form, coins, tokens etc or can also be stuck in the form of a label on to the kinds of document 1 referred to in the opening part of this specification. The information strip 2 is rectangular and has on at least two lines a division into equal-sized raster or grid elements 14, 15. The longitudinal boundary of the information strip 2 is disposed parallel to the abscissa axis X. The grid elements 14 of the first line all have the same region of the ordinate $Y_1$ and the grid elements 15 of the second line all have the same region of the ordinate $Y_2$. The N grid elements 14 and 15 respectively in each line differ in the abscissa $X_k$, wherein the index k ranges through the values of between 1 and N. In the new state, that is to say in the unwritten state, of the information strip 2, the N grid elements 14 exhibit an identical optical behaviour. The optical behaviour of the N grid elements 15 is also identical and differs from the optical behaviour of the grid elements 14.

Figure 1B:
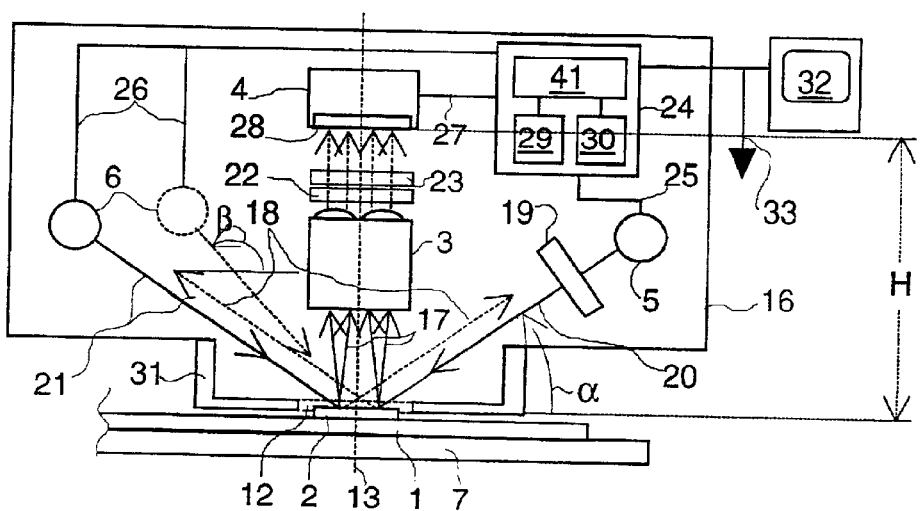
FIG. 1b is a view in section of the arrangement for the reading operation.

Referring to FIG. 1b, shown therein is a view in section of the reading arrangement, with the reading plane 7 and the plane of symmetry 13 being perpendicular to the plane of the section. The reading arrangement is disposed in a housing 16 which keeps out external light and prevents light from the lighting device 5, 6 from penetrating directly to the detector arrangement 4. Two lighting devices 5, 6 extend along the optical imaging element 3 above the document 1 parallel to the plane of symmetry 13 and to the reading plane 7. The imaging element 3 is spaced from the surface 11 (FIG. 1a) in such a way that each lighting device 5 or 6 respectively is solely capable of completely and as uniformly as possible illuminating the reading region. As shown in the drawing, the light paths can extend rectilinearly and/or can be deflected by means of prisms, mirrors, optical waveguides and so forth, for example in order to afford a reading arrangement which is suitably adapted to the installation conditions involved.

The optical imaging element 3 collects the light 7 which is incident at the information strip 2 at its acceptance angle and which ideally is deflected substantially almost parallel to the plane of symmetry 13 by scatter or diffraction, in such a way that at least in its longitudinal extent an image of the information strip 2 is formed on the photosensitive faces of the detector arrangement 4. Light 18 reflected at the surface 11 or other faces is not captured by the imaging element 3.

In the simplest case the lighting devices 5, 6 involve a linear extent of a light source in parallel relationship to the longitudinal side of the reading region 12. Examples are double-ended tubular incandescent lamps with an extended incandescent wire, fluorescent tubes or a linear arrangement of light emitting diodes and so forth. Arranged between the lighting devices 5 and 6 and the reading region 12 there is advantageously an optical system 19 which produces a lighting beam 20 and 21 respectively. The optical system 19 homogenises the intensity of the lighting effect in the reading region 12 and/or collimates the lighting beam 20 and 21 respectively. The light of a point-form light source, for example produced with a laser diode, is also expanded by the optical system 19 to the dimensions of the reading region 12. That provides for a uniform lighting effect in the entire reading region 12. The lighting directions α, β are the projections of the lighting beams 20, 21 which are incident on the reading region 12, on to a plane which is perpendicular both to the plane of symmetry 13 and also to the reading plane 7, and are incident on the reading region 12 at lighting directions α, β. The lighting direction α and β respectively forms with the reading plane 7 an angle which is in the range of between 10° and 60° for the lighting direction α and in the range of between 120° and 170° for the lighting direction β. The optical system 19 comprises a diffuser lens or screen, a cylindrical lens, a holographically generated optical element (HOE) and so forth, individually or in combination with a color filter and/or with a polarisation filter and so forth. The quality of the light in the lighting beam 20 and 21 respectively can be established with the filters. For each line of the information strip, which is to be successively read out, the lighting is established in the reading region 12 in terms of the quality of the light and/or the lighting direction α, β. The reading arrangement produces successively in accordance with the number of lines in the information strip 2 two or more lighting beams 20, 21. The lighting devices 6 can be arranged on the same side of the imaging element 3 in order to illuminate the reading region 12 from the various lighting directions α, β and/or with the different qualities of light. An embodiment with a lighting device 5 in which the quality of the light in the lighting beam 20 is variable or at least two qualities of light, for example polychromatic light, are simultaneously emitted, is to be interpreted as a special case. In another embodiment the lighting devices 5, 6 are arranged on both sides of the plane of symmetry 13, symmetrically or asymmetrically.

If the entire photosensitive face of the detector arrangement 4 is in the shape of a rectangle, an additional optical element, a one-dimensional diffuser 23, is advantageously arranged between the imaging element 3 and the detector arrangement 4, in order to increase the positional tolerance of the information strip 2 in the reading region 12 and to lower the sensitivity to local defects in the grid elements 14, 15. The one-dimensional diffuser 23 blurs the imaging effect of the grid elements 14, 15 in the direction of the ordinate Y in such a way that at least a part of the deflected or diffracted light 17 of both grid elements 14 and 15 extends over the entire width of the total photosensitive face of the detector arrangement 4. An anisotropic matt structure, a simple diffraction grating with a spatial frequency of less than 150 lines/mm or cylindrical lenses have that property of diffusing light only parallel to one plane. In order to recognise the differences produced by the information strip 2 in polarisation of the light, a polarisation filter is arranged as an analyser 22 between the imaging element 3 and the detector arrangement 4. The relief structure of the one-dimensional diffuser 23 can be impressed directly into the plastic foil or sheet of the analyser 22 (type Polaroid®) so that the analyser 22 and the one-dimensional diffuser 23 form a single component.

The reading arrangement has an evaluation unit 24 which controls the reading cycle and which is adapted to recognise the item of information. For that purpose, the evaluation unit 24 is connected to the lighting devices 5 and 6 by way of control lines 25, 26 so that the lighting devices 5 and 6 can be sequentially switched on and off by the evaluation unit 24. The lighting direction α and β respectively and the quality of the light in the lighting beam 20 and 21 respectively is established for illumination of the reading region 12 by virtue of switching on the lighting device 5 or 6 respectively. The detector arrangement 4 is connected to the evaluation unit 24 by way of signal lines 27. By way of the one signal line 27 the evaluation unit 24 sends a reading signal to the detector arrangement 4 and causes read-out of detector signals S(1) and S(2) which correspond to the brightness values, recorded by the photodetectors 28, of the information strip 2 whose image is formed on the photosensitive faces of the detector arrangement 4. The detector signals S(1) and S(2) go by way of the other signal lines 27 into one of the two data stores 29, 30 of the evaluation unit 24.

In an embodiment, the reading plane 7 is not connected to the rest of the reading arrangement. In this embodiment, the reading arrangement has a window for delimiting the reading region 12. The frame 31 of the window, which is part of the housing 16, serves as a support for the document 1, wherein the surface 11 (FIG. 1a) of the document 1 is directed with the information strip 2 for the reading operation towards the window. In an embodiment without the frame 31 the reading plane 7 is spaced from the housing 16. The document 1 can be easily oriented by hand in the lit reading region 12 until the reading arrangement mechanically reads off the information correctly from the information strip 2. A monitor 32 which is connected to the evaluation unit 24 by way of a line 33 makes it possible to recognise successful reading of the information strip 2. In the simplest case the monitor 32 is a red/green signal which changes from red to green when the information is correctly recognised. The line 33 can also pass the read-out information to other units (not shown here) which for example release a block, send the read-out information to a central station, and possibly interrogate additional data associated with the read-out information, from the central station, and so forth.

The reading cycle advantageously comprises two reading phases for reading the information out of the information strip. Each two reading phases are separated by a respective reading break in which the detected information is processed by the evaluation unit 24. By way of switching the lighting device 5 or 6 respectively on and off, the evaluation unit 24 controls the lighting direction α, β and/or the quality of the light emitted in the lighting beam 20 and 21 respectively. Each reading phase differs from the preceding one by the lighting direction α, β and/or the quality of the emitted light. At the beginning of the reading phase, the lighting device 5 or 6 is switched on and the reading region 12 is lit up. At the end of the reading phase the evaluation unit 24 implements the reading-out operation and causes transmission of the brightness values recorded by a plurality of photodetectors 28 by way of the signal line 27 and switches the lighting device 5 or 6 off. The evaluation device 24 receives a first sequence of signals whose signal values reproduce the brightness distribution on the photosensitive faces of the detector arrangement 4 during the first reading phase in which the reading region 12 is lit from the first lighting direction α and/or with the first quality of the emitted light and light 17 reflected into the imaging element 3 originates from the grid elements 14 (FIG. 1a) of the first line, which are not altered in terms of their optical behaviour. In the subsequent second reading phase the evaluation unit 24 receives a second sequence of signals whose signal values correspond to the brightness distribution during the lighting of the reading region 12 from a second lighting direction β and/or with a second quality of the emitted light and the reflected light 17 originates from the grid elements 15 (FIG. 1a) of the second line, which are not altered in terms of the optical behaviour involved.

The reading arrangement is to be adapted to the technology of the information strip 2. In a simple embodiment, the information strip 2 is a colored, diffusely scattering substrate, for example paper, plastic material, metal and so forth, while the grid elements 14 and 15 are of complementary colors (for example red-green). By virtue of being printed on in a color which absorbs the colors red and green (for example black), the grid elements 14 and 15 can be altered in terms of their optical behaviour. In accordance with the reading phase the lighting device 5 or 6 is switched on, which at a lighting angle α or β respectively lights the reading region 12 with red or green light in such a way that the light which is diffusely scattered in the reading region 12 and received by the imaging element 3 forms an image of the red or green grid elements 14 and 15 respectively with a high brightness value on the photosensitive faces of the detector arrangement 4. In contrast thereto the brightness value of the captured scatter light from the grid elements 14, 15 which are printed black or from the green grid elements 15 in red light or the red grid elements 14 in green light is slight compared to the high brightness values.

Figure 2A:
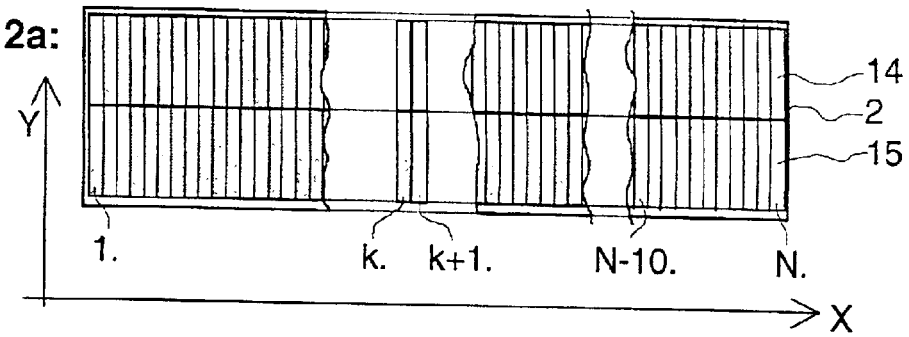
FIG. 2a shows an information strip.

FIG. 2a shows an example of a two-line information strip 2 with N grid or raster pairs. The k-th grid pair is formed from a grid element 14 of the first line and a grid element 15 of the second line, with the same value for the abscissa $X_k$. Each grid pair affords space for a bit of an item of digital information, wherein in the operation of writing to the information strip 2 the optical behaviour of one of the two grid elements 14 and 15 respectively is modified, which for technical reasons is illustrated in the drawing of FIGS. 1a and 2a by hatching of the surface of the grid element 14 and 15 respectively. As only two out of four possible states of the grid pair are used, an item of written-in information cannot be altered. If both grid elements 14 and 15 are modified in terms of their optical behaviour, that indicates manipulation or excessive use of the document 1 (Figure. a). An information strip 2 which is not written is distinguished by unmodified grid elements 14 and 15 in the same grid pair, as for example the grid pairs N–10 through N.

The k-th grid pair whose grid element 15 in the second line is modified represents for example the bit value '1' and the k+1-th grid pair whose grid element 14 in the first line is modified represents the bit value '0'. The first line of the information strip 2 therefore has the same information as the second line, but in the second line the sequence of the grid elements 15 which are modified and unmodified in respect of optical behaviour is interchanged or inverted in relation to the sequence of the modified and unmodified grid elements 14 in the first line. If the two lines are read in succession, that inversion of the succession involved can be easily checked by machine. In the first reading phase the first line is read from the first grid pair; the first sequence begins with 'ummumuumuuummumuu', while in the second reading phase, the second line, read in the same direction, the beginning of the second sequence reads 'muumum-mummmuumumm . . . ', in which 'm' stands for a modified grid element 14 or 15 and 'u' stands for an unmodified element. By inversion of the second sequence (interchange of m and u) and comparison with the first sequence, the read-out information is checked for correct reading-off and authenticity. The resulting sequence '1001011011100 1011 . . . ' is the recognised information, having regard to the association of the bit values.

The sequence of information in an example is arranged between a predetermined start sequence and stop sequence each for example of 8 bits. The start sequence indicates to the reading arrangement that a subsequent item of information of predetermined length is being read in the same succession, in relation to the stop sequence. If the stop sequence is read first, it signals to the evaluation unit 24, reading of the subsequent item of information in the reversed succession. The item of information can also be arranged in the form of a palindrome, in which case the first half contains all the information which is repeated in the second half in the reverse succession of the bits. In another embodiment, the start and stop sequence is fixedly predetermined in manufacture of the information strip 2 and does not need to be produced when writing in the information.

A higher level of information density and a better signal-to-background ratio is enjoyed by the information strips 2 whose grid elements 14, 15 have fine relief structures which reflectingly diffract light incident from a predetermined direction in the reading region with a high level of intensity into the direction which is predetermined by the imaging element 3. The grating lines of the fine relief structures are advantageously oriented substantially parallel to the abscissa axis X. The high level of intensity of the light 17 (FIG. 1b) diffracted at the grid elements 14, 15 makes it possible to use smaller grid elements 14, 15 for the information strip 2, without having to accept losses in terms of reading reliability. Typically, a grid pair measures between 0.5 and 3 mm in width and between 0.1 and 0.5 mm in length.

The reading arrangement in FIG. 1b is designed for reading the information strips 2 of a width of 1.5 mm and a total length of 25 mm with a capacity of 160 bits for the item of information and in addition 8 bits for each of the start and stop signals, and can be implemented very compactly in a small space. It is composed at least of the following components:

a) The detector arrangement 4 is a component which is available under the designation ILX511 2048-pixel CCD Linear Image Sensor from SONY. The number of photodetectors 28 is M=2048. They each have a photosensitive face measuring 14 $\mu$m×200 $\mu$m, while the linear distribution along the abscissa axis X (FIG. 3) is 14 $\mu$m and the total length is 28.7 mm;

b) the imaging element 3 is the SELFOC® 'Lens Array' SLA-20B, a dual-row bundle of 6.7 mm long, thick lenses of between 0.8 and 1.2 mm in diameter, in which the spacing H between the object plane and the image plane is about 15.4 mm and imaging is in the ratio of 1:1;

c) the lighting devices 5, 6 are arranged symmetrically with respect to the plane of symmetry 13 and are formed by means of a linear row of light emitting diodes. Their color light and lighting beam 20, 21 are matched to the grid elements 14, 15. In order to homogenise the light from the point-form light emitting diodes in the reading plane 12, the optical system 19 has uniformly scattering, properties;

d) the one-dimensional diffuser 23 and optionally the analyser 22; and e) the evaluation device 24 with monitor 32.

The length of each grid pair k (FIG. 2a), as measured: on the abscissa axis X, is thus 0.14 mm which is scanned by in each case approximately 10 photodetectors 28 arranged in a line in mutually juxtaposed relationship. The reading arrangement can be disposed in a housing 16 involving the approximate dimensions of 30×40×20 mm; that facilitates installation in other items of equipment (not shown), for example reading apparatuses for IC-cards etc. The advantage is the compact inexpensive structure of the reading arrangement. Reading-out and recognition of the item of information are effected within a few milliseconds so that the information strip 2 can be read off even from a moving document 1. The movement is advantageously in the direction of the ordinate Y (FIG. 1a), that is to say transversely with respect to the information strip 2.

Figure 2B:
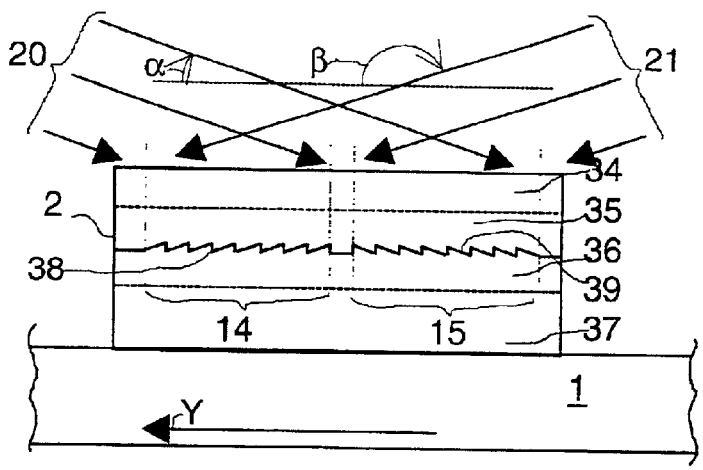
FIG. 2b is a view in section of the information strip.

FIG. 2b shows the information strip 2 in an embodiment with relief structures, as a view in cross-section. The information strip 2 is a laminate comprising plastic layers 34, 35, 36, 37. At least the cover layer 34 and the embossing or stamping layer 35 are transparent in relation to the light of the lighting so that the information can be read out through those two layers 34, 35. The detailed structure of the laminate is described for example in EP 0 401 466 B1. The cover layer 34 has at least a high level of scratch resistance, as is known from lacquers, in particular lacquers which are hardened by UV, or for example PC, PETF or other foils, even in thicknesses in the micrometer range. The stamping layer 35 and the protective layer 36 include at their joint interface fine relief structures in the form of diffraction structures 38, 39. A sudden change in the refractive index at the interface increases the intensity of the diffraction effects at the diffraction structures 38, 39. That is effected by an additional layer, which is between 10 and 500 nm in thickness, of metal, semiconductor or a dielectric in the interface, or solely by using materials for the stamping layer 35 and the protective layer 36, which involve a difference in refractive index. The adhesive layer 37 joins the laminate to the document 1. Both cold adhesives and also hot melt adhesives have proven their worth here. The adhesive layer 37 is unnecessary if the material of the protective layer 36 itself is an adhesive. The material of the information strip 2 is produced in the form of a strip, from which suitable pieces are cut off and joined to the document 1. If the cover layer 3 and the stamping layer 35 are made from the same material, it is not possible to see any boundary between the cover layer 34 and the stamping layer 35. For example, the information strip 2 can be inconspicuously embedded within a hologram image or in a mosaic of other diffraction elements, the grating parameters of which differ from those of the two diffraction structures 38 and 39 in such a way that the other diffraction elements do not deflect light from the lighting devices 5, 6 into the imaging element 3.

In the unwritten condition of the information strip 2 all grid elements 14 have the same diffraction structure 38 and the grid elements 15 have the same diffraction structure 39. The diffraction structures 38 and 39 must differ at least in respect of one parameter of the grating structure such as spatial frequency, azimuth, grating profile and so forth. The diffraction structure 38 or 39 respectively satisfies the requirement of diffracting the lighting beam 20 or 21 into the imaging element 3 and diffracting the other lighting beam 21 and 22 respectively in such a way that no or distinguishably less light of the lighting beam 21 and 20 respectively passes into the imaging element 3. The unwritten information strip 2 has no information as all diffraction structures 38, 39 are optically active. When the information is written in, the diffraction structures 38, 39 which are no longer required are irreversibly modified in respect of their optical behaviour so that at best scatter light of low intensity passes into the imaging element 3 from the diffraction structures 38, 39 which are not required. Methods and means for irreversibly modifying the optical behaviour of the diffraction structures 38, 39 are described in above-mentioned EP 0 718 795 A1, column 4, line 33 to the top of column 6.

In an embodiment of the information strip 2, the grid pairs of the start and stop sequences are already fixedly encoded upon manufacture, in which case, instead of the diffraction structures 38 and 39 which are modified in terms of optical behaviour in the grid element 14 or 15 respectively there is a mirror or a third relief structure. The third relief structure does not diffract the lighting beams 20, 21 into the imaging element 3 (FIG. 1b) or diffusely scatters same, as a matt structure. In a further embodiment of the information strip 2 all grid elements 14, 15 and thus all the information are fixedly encoded in the same way as the start and stop sequences. The grid elements 14, 15 of an embodiment of the information strip 2 with fixedly encoded information can also merely consist of one line, in which case, arranged in that line, instead of the first diffraction structures 38 which are not required for the information, are the second diffraction structures 39. The information strip 2 of this embodiment can be read out with the same reading arrangement.

In another embodiment of the information strip 2 the diffraction structures 38, 39 are incorporated directly into the base material of the document comprising laminate, plastic, metal and so forth. The base material is formed from the layers 34, 35. The reading-out operation is effected through the transparent protective layer 36.

In the illustrated example the asymmetric diffraction structures 38 and 39 differ only in respect of azimuth, the difference being 180°, that is to say they are arranged in mirror image symmetry. The two lighting devices 5 and 6 are arranged symmetrically with respect to the plane of symmetry 13 (FIG. 1a) and are adapted to produce monochromatic light. When the information strip 2 is disposed in the reading region 12 (FIG. 1a) which in the first reading phase is illuminated with light of the first lighting beam 20 from the first lighting direction a, the imaging element 3 (FIG. 1a) only collects the light 17 (FIG. 1b) which is reflected and diffracted at the diffraction structure 38 of the unmodified grid elements 14, 15, and forms the image of the brightness distribution on the photosensitive faces of the detector arrangement 4 (FIG. 1a). In the first and second reading phases respectively, at the first and second diffraction structures 38 and 39, the first and second lighting beams 20 and 21 respectively are diffracted with a high level of efficiency into the plus first order and at the same time diffracted into the minus first order with a markedly lower level of efficiency at the second and first diffraction structures 39 and 38 respectively. The imaging element 3 collects the diffracted reflected light 17 (FIG. 1b) and produces brightness values which are to be markedly distinguished on the photosensitive faces of the detector arrangement 4. Any scatter light which is detected by the imaging element 3 has only slight differences in intensity in the two reading phases and does not disturb the brightness distribution on the photosensitive faces of the detector arrangement 4. If the asymmetrical diffraction structures 38 and 39 additionally differ in their spatial frequencies, they can be selected in such a way that the first and second lighting beams 20 and 21 respectively, of the minus first order, which are diffracted at the second and first diffraction structures 39 and 38 respectively, are not detected by the imaging element 3.

If the diffraction structures 38 and 39 differ only in respect of spatial frequency, the lighting devices α, β and/or the wavelengths $\lambda_1, \lambda_2$ of the lighting beam 20, 21 must be adapted. The wavelengths $\lambda_1, \lambda_2$ and the lighting directions α, β establish the spatial frequency for the diffraction structures 38 and 39.

Diffraction structures 38, 39 which are known from WO 97/19821, with low spatial frequencies (between 50 and 250 lines/mm) and with a grating profile involving a height of between 0.7 μm and 1.5 μm, exhibit an achromatic diffraction behaviour, that is to say even a polychromatic light can be used for lighting the reading region 12 if such diffraction structures 38, 39 deflect the tightly focused, polychromatically diffracted light into the imaging element 3.

WO 98/10324 describes diffraction gratings which differ only in terms of their polarisation capability. If such diffraction gratings are adopted for the diffraction structures 38, 39, lighting of the reading plane 12 (FIG. 1a) is effected with differently polarised light, using a polarisation filter in the optical system 19 (FIG. 1b) for the lighting beams 20, 21. In another embodiment the polarisation filter is arranged as an analyser 22 between the imaging element 3 and the detector arrangement 4 and lighting of the reading region 12 (FIG. 1a) is effected with unpolarised light.

If the diffraction structures 38, 39 are symmetrical the lighting devices 5, 6 can also be arranged on the same side of the plane of symmetry 13. If the lighting of the reading region 12 differs only in respect of the wavelength of the light incident in the reading region 12 (FIG. 1a) at the lighting direction ax, then a linear arrangement of light emitting diodes is advantageously adopted, in which case the light emitting diodes differ in the color of the emitted light. The light emitting diodes of the various colors alternate in the linear arrangement in such a way that the reading region 12 is uniformly illuminated in one color when only the light emitting diodes of the same color are simultaneously switched on in a reading phase. Light emitting diodes which emit light in two or more colors are also suitable for the linear arrangement, in which case the color is adjustable under external actuation. Simultaneous actuation of the colors produces a polychromatic light.

Figure 3:
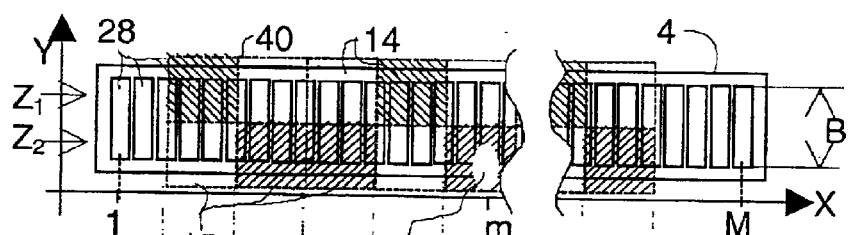
FIG. 3 shows a detector arrangement.

FIG. 3 shows the photosensitive side of the detector arrangement 4 with an image 40 of the grid pairs of the information strip 2 (FIG. 2a), the image 40 being shown in broken line here for reasons of drawing and being produced by the imaging element 3 (FIG. 1b) without the one-dimensional diffuser 23 (FIG. 1b). In the first reading phase the reading region 12 (FIG. 1a) is lit with the lighting device 5 (FIG. 1a). In the image 40 the grid elements 14 of the first line, with the ordinate Y=$Z_1$, which are shown with inclined hatching in the drawing and which are unmodified in terms of optical behaviour, are zones involving a high level of light intensity. The grid elements 15 of the first line, which are shown without hatching and which are modified in terms of optical behaviour, and all grid elements 15 of the second line, with the ordinate Y=$Z_2$, project light 17 (FIG. 1b) at at least 50% less intensity on to the detector arrangement 4 and are imaged in the form of dark zones. The lighting device 6 (FIG. 1a) is switched on in the second reading phase so that only the image of the hatched grid elements 15 of the second line, which are unmodified in terms of optical behaviour, is formed in the image 40.

The commercially available, single-line detector arrangements 4 are of a value of between 7 $\mu$m and 200 $\mu$m, for the width B. The subdivision along the abscissa axis X has a pitch of 7 $\mu$m, 14 $\mu$m or more, so that each photodetector 28 therefore has a photosensitive face of a width B times the pitch. The information strip 2 is to be readable with a high level of reliability without involving high demands on alignment in the reading region 12. That advantage is achieved by the width B of the photosensitive face of the photodetectors 28 being greater than 0.1 mm and by the imaging 38 in the ordinate direction Y being additionally blurred in respect of width B by means of the one-dimensional diffuser 23 (FIG. 1b) in order to tolerate a displacement perpendicularly to the plane of symmetry 13 (FIG. 1b). In addition the fineness of the subdivision along the abscissa axis X determines the resolution capability of the detector arrangement 4 on the abscissa axis X. So that the detector arrangement 4 correctly detects the subdivision of the information strip 2, even if the subdivision into the N grid pairs and the division of the M photodetectors 28 are not oriented precisely along the abscissa axis X and/or are not commensurable, the subdivision of the detector arrangement 4 on the abscissa axis X must be so fine that the image 40 of each of the N grid pairs covers at least three photodetectors 28. For the information strip 2 with N grid pairs the number M of the photodetectors 28 is at least three times N. The length of the detector arrangement 4 is advantageously greater than the length of the information strip 2 to be read so that the information strip 2 does not have to be precisely aligned lengthwise in the reading region 12 for the reading-off operation. Accordingly the first and last photodetectors 28 lie outside the image 40 and only receive scatter light. That makes it possible to measure the length of the information strip 2.

Instead of a single-line detector arrangement 4 it is advantageously possible to use a multi-line detector arrangement, for example with photosensitive faces of the photodetectors 28 each measuring 14 $\mu$m×14 $\mu$m in 128 lines. This somewhat expensive structure permits a greater degree of tolerance in relation to inclined orientation of the information strip in the reading region 12 as it is possible to compensate for the rotation with respect to the plane of symmetry 13 (FIG. 1) by means of electronic correction.

The detector arrangements 4 considered hitherto are not designed for recognising color components in the light 17. Instead of the detector arrangements 4 which are sensitive to black and white, it is also possible to use a color-sensitive detector arrangement 4, such as for example the CCD Linear Sensor ILX 522K from SONY. Integrated color filters in front of the photodetectors 28 make it possible for the colored image 40 to be detected and analysed separately in the three primary colors blue, green and red, with color signals of the photodetectors 28. If the diffraction structures 38 (FIG. 2b) and 39 (FIG. 2b) differ only in spatial frequency, a single polychromatic lighting device 5 is sufficient, which emits at least light of wavelengths $\lambda_1$, $\lambda_2$ which are predetermined by the diffraction structures 38 and 39 and the lighting direction $\alpha$ (FIG. 2b) in order to read out the information and check it for authenticity. The reading arrangement in this embodiment has a modified reading cycle. The single reading phase is followed in the evaluation unit 24 (FIG. 1b) by filtering of the color signals of the colored image 40 in accordance with the predetermined wavelengths $\lambda_1$, $\lambda_2$ and the association of the filtered color signals with the grid elements 14, 15 in order to form two sequences of the detector signals S(1) and S(2) respectively. The detector signals S(1), S(2) correspond to the detector signals S(1), S(2) of the black-white-sensitive detector arrangement 4. The polychromatic lighting of the reading region 12 (FIG. 1a) at the lighting direction a does not have to be continuously switched on and off for that purpose.

Figure 4:
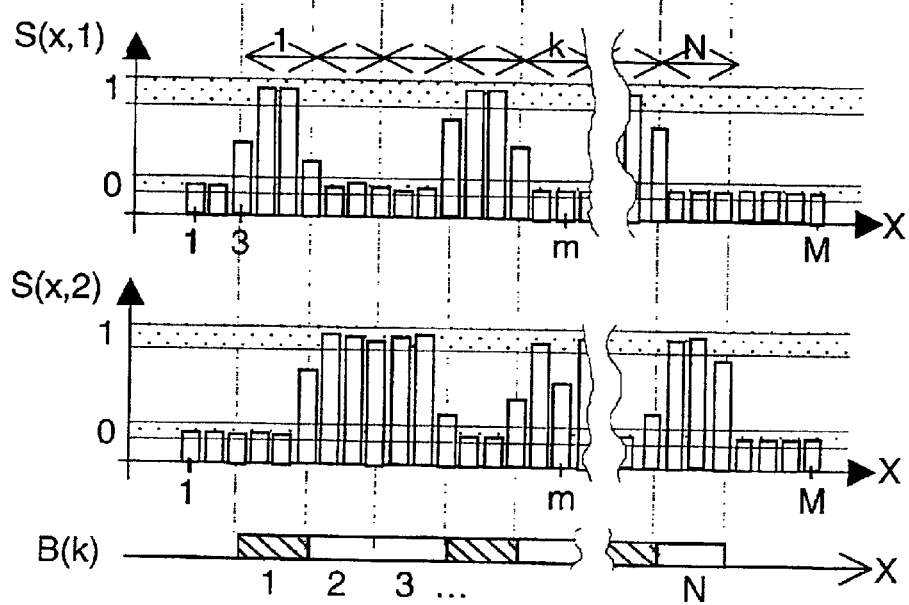
FIG. 4 shows a first and second sequence of detector signals.

FIG. 4 which is related to FIG. 3 shows the first sequence of detector signals S(x,1) for the first reading phase and the second sequence of detector signals S(x,2) for the second reading phase, which are successively produced by the M photodetectors 28 (FIG. 3). In order to clearly show the association between the detector signals S(x,1) and S(x,2) with the N grid pairs in the image 40 (FIG. 3), dotted vertical lines are taken to the diagrams in FIG. 4. The detector signals S(x,1) and S(x,2) are transmitted to the evaluation unit 24 (FIG. 1b), for example serially, through the signal line 27 (FIG. 1b) after each reading phase, after the evaluation unit 24 has sent the reading signal through the signal line 27 (FIG. 1b) to the detector arrangement 4 (FIG. 1b) and stored it in digitised form in the memory 29 (FIG. 1b) or 30 (FIG. 1b). In addition, the second reading phase also involves evaluation of the stored detector signals S(x,1), S(x,2). The reading cycle then begins afresh. A schematic description outlines the evaluation operation.

A computer 41 (FIG. 1b) of the evaluation unit 24 (FIG. 1b) firstly prepares the sequences S(x,1), and S(x,2) for information recognition. For that purpose the sequences S(x,1) and S(x,2) are typically filtered and any location-dependent amplitudes and/or offsets corrected. If the signals obtained in that way are within established ranges of signal levels '1' or '0', then the corresponding bit state '1' or '0' is associated for x=1 through M with all detector signals S(x,1) and S(x,2) and stored as a bit signal S(x,1) and S(x,2). If one or more of the detector signals S(x,1) and S(x,2) are disposed locally between the two levels, the computer 41 interprets that as a consequence of partially destroyed grid elements 14, 15 and associates with those signals a further state 'undefined'. The drawing in FIG. 4 shows the regions for the signal levels '0' and '1' as hatched bands.

In the view shown in FIG. 3, present in the image 40 in the second line $Z_2$ at the fifth grid element 15 from the left as an example is a 'blind spot' 42 which has occurred as a consequence of damage to the information strip 2 (FIG. 1a) and which reduces the level of light intensity of that grid element 15 in the image 40 in the second reading phase. The detector signal S(m,2) is therefore too low and the computer 41 (FIG. 1b) therefore associates the state 'undefined' with the bit signal S(m,2). Further 'undefined' states can occur in the region of the boundaries between various values of the light intensity in the image 40 as the subdivision into the N grid elements 14, 15 generally does not coincide with the division of the M photodetectors 28, for example at the signal S(3,1) of the third photodetector 28. The fact that the images 38 in the two reading phases, in relation to the detector arrangement 4, are not displaced relative to each other, is a further advantage of the reading arrangement, because the bit signals S(x,1) and S(x,2) are associated for each x with the common grid pair k and a pair sequence P(x) of x pairs P(x) can be formed from the sequences of the bit signals S(x,1) and S(x,2). In the ideal case there is in the pair sequence P(x) only four value combinations of the bit signals S(x,1) and S(x,2): the value combination with S(x,1)=1 and S(x,2)=0 (='1,0'), the value combination with S(x,1)=0 and S(x,2)=1 (='0,1') and the value combinations S(x,1)=S(x,2)=1 (='1,1') and S(x,1)=S(x,2)=0 (='0,0'). Just one pair P(x) with the value combination '1,1' indicates an incompletely written information strip 2 and causes the computer 41 (FIG. 1b) for example to break off the evaluation operation and/or to display a fault on the monitor 32 (FIG. 1b). The value combination '0,0' may regularly occur exclusively at both ends of the pair sequence P(x) as the detector arrangement 4 projects beyond the information strip 2. They form two groups of i and j successive terminal pairs. In the example of FIG. 4 these are the signals S with x=1,2 and x=M−3, M−2, M−1, M. Between the two groups of the terminal pairs the information is contained in the M−(i+j) elements of the pair sequence P(x) which are distributed uniformly to the predetermined number N, for example N=176, N=160 etc of the grid pairs of the information strip 2 and determine the N elements of a bit sequence B(k), the information, wherein k ranges through the values of between 1 and N. The value combinations '1,0' and '0,1' respectively of the pairs of the pair sequence P(x), which are associated with the same element B(k), determine the content of the element B(k), if for example for an element B(k) the plurality of the associated P(x) has the value combination '1,0', B(k)='1', while for the value combination '0,1' B(k) is set='0'. The view in FIG. 4 shows the bit sequence B(k) obtained from the sequences S(x,1) and S(x,2), wherein hatching stands for the value '1' and clear rectangles stand for the value '0'. The read-out information therefore begins with '10010 . . . .'

The pairs in the pair sequence P(x) with two undefined states are disposed at the transitions from high to low or from low to high intensity values in the image 40 because the boundary between two grid pairs divides the photosensitive face of the photodetector 28 or the grid pairs are not perfectly imaged and therefore a proportion of the image 40 of high intensity is recorded in both reading phases by the photodetector 28. Environmental influences such as scratches, fouling and so forth can damage the information strip 2 in such a way that the represented information can no longer be recognised without a gap. The described encoding of the optically machine-readable information by two states out of four possible ones affords the advantage that the damage does not cause the value of the grid pair to change to the other defined state, that is to say from '0' to '1' or from '1' to '0', but to one of the other two undefined states.

The pairs P(x) with an undefined state and the pairs P(x) which are clearly not classified as terminal pairs, with the value combination '0,0', can be reconstructed on the basis of their known local position and in comparison with their adjacent values, that is to say, attributed to those pairs P(x) are the most probable value combination '1,0' and '0,1' respectively, the computer 41 using one of the error functions known to the man skilled in the art. The information is advantageously contained on the information strip 2 a plurality of times, for example as a palindrome, as even in the event of massive damage the information can be reconstructed from the fragments which have still been retained.

Figure 5:
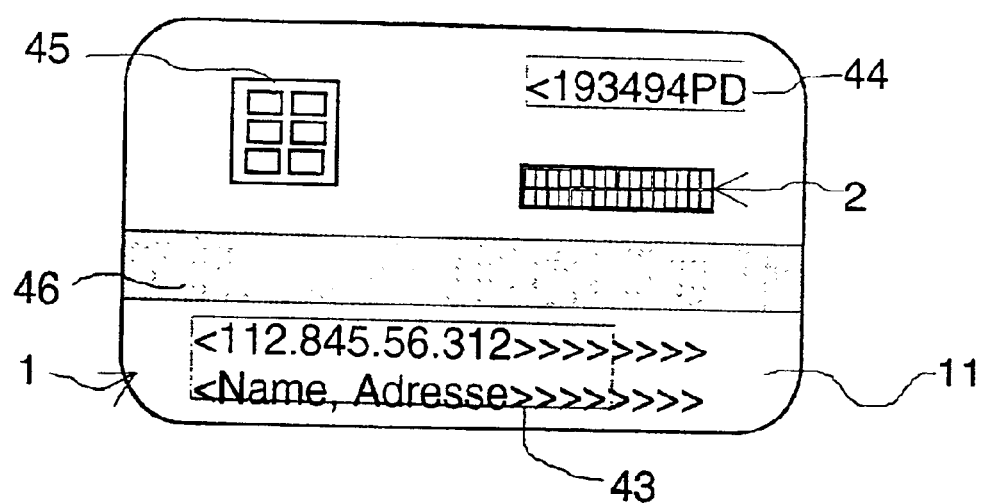
FIG. 5 shows a document.

FIG. 5 shows the document 1 by way of example in the form of a personal identity card, credit card or value card. The document 1 carries the information strip 2 on its surface 11 and on the surface 11 has information panels 43, 44 with items of information in machine-readable plain text, such as for example name, date of birth, period of validity, nationality, biometrical data, pass number and so forth. In the case of value cards, further electronic data relating to the identity of the card are stored in an IC-module 45 and/or magnetically on a magnetic strip 46, with the latter generally being disposed on the rear of the document 1.

Reading units or verifying devices which are shown in FIG. 7 of as yet unpublished application CH 2557/98 and which belong to a security system as described in CH 2557/98 are suitable for machine checking of the documents for authenticity by means of checking members. Instead of the optical reader of the reading unit, described in CH 2557/98, it is possible to use the reading arrangement described here. The text of application CH 2557/98 and FIGS. 1 through 3 and 7 of CH 2557/98 are expressly incorporated into this description. Besides the reading arrangement the reading unit includes at least one plain text reader for reading visually readable information. In addition to or also instead of the plain text reader a device for reading information out of the IC-module 45 and/or out of a magnetic strip 46 can be arranged in the reading unit.

What is claimed is:

1. A reading arrangement comprising at least one detector arrangement arranged over a strip-shaped reading region in a reading plane and behind an optical imaging element, at least one lighting device arranged above the reading plane for completely illuminating the reading region from at least a first lighting direction and an evaluation unit for machine reading of a strip-shaped information strip with information optically encoded as a bit sequence which is disposed in the reading region of the reading plane, wherein a plane of symmetry is oriented parallel to an optical axis of the imaging element and intersects the imaging element, the detector arrangement comprising an at least one-line linear arrangement of photodetectors and the reading region centrally in the longitudinal direction, wherein the optical imaging element serves to produce an image of the entire reading region on photosensitive faces, which are oriented parallel to the reading plane, of photodetectors of the detector arrangement, the evaluation unit has a reading cycle with at least two reading phases, in the reading phases, the lighting in the reading region differs in the lighting direction and/or the quality of the light emitted by the lighting device, the evaluation unit is adapted at least to receive and evaluate first detector signals of the photodetectors in the first reading phase and to receive and evaluate second detector signals of the photodetectors in the second reading phase in order to form a first and second sequence from the first detector signals and the second detector signals and, by inversion of the second sequence and comparing it with the first sequence the read-out information is checked for correct reading-off and authenticity, to obtain a verified bit sequence, and the evaluation unit is adapted to detect an element of the first and second sequence, respectively, out of the detector signals of at least three photodetectors arranged in a line in mutually juxtaposed relationship.

2. A reading arrangement as set forth in claim 1, wherein there are provided at least a first and a second lighting device for lighting of the reading region and the emitted light of the lighting devices is substantially monochromatic and differs in wavelengths.

3. A reading arrangement as set forth in claim 2, wherein at least one lighting device comprises a linear arrangement of a plurality of light emitting diodes.

4. A reading arrangement as set forth in claim 1, wherein two lighting devices are provided and arranged symmetrically with respect to the plane of symmetry.

5. A reading arrangement as set forth in claim 1, wherein the detector arrangement is a charge coupled device.

6. A reading arrangement as set forth in claim 1, wherein a polarization filter is arranged as an analyzer between the optical imaging element and the detector arrangement.

7. A reading arrangement as set forth in claim 1, wherein the single lighting device comprises a linear arrangement of a plurality of light emitting diodes differing by virtue of the color of the emitted light, the light emitting diodes of the various colors are uniformly distributed in the linear arrangement and all light emitting diodes of the same color can be switched on simultaneously for light emission independently of the light emitting diodes of the other colors.

8. A reading unit for reading a document with an information strip comprising a reader arrangement as set forth in claim 1, and a plain text reader included for reading visually readable information of the document and/or a device for reading electronic data out of an IC-module of the document and/or a device for reading electronic data out of a magnetic strip of the document.

9. A reading arrangement comprising at least one detector arrangement arranged over a strip-shaped reading region in a reading plane and behind an optical imaging element, at least one lighting device arranged above the reading plane for complete illumination of the reading region from at least a first lighting direction, and an evaluation unit for machine reading of a strip-shaped information strip with information optically encoded as a bit sequence which is disposed in a reading region of the reading plane, wherein a plane of symmetry is oriented parallel to an optical axis of the imaging element and intersects the imaging element, the detector arrangement comprising a linear and at least single-line arrangement of photodetectors and the reading region centrally in the longitudinal direction, wherein arranged over the reading plane is at least one polychromatic lighting device for complete illumination of the reading region from the lighting direction by means of lighting beams which contain light of at least two predetermined wavelengths, the optical imaging element serves to produce a colored image of the entire reading region on photosensitive faces, which are oriented parallel to the reading plane, of photodetectors of the detector arrangement, the photodetectors have color filters in front of the photosensitive face to allow the detection and analysis of the colored image in the three primary colors blue preen and red, and to produce color signals of each primary color, the evaluation unit has a reading cycle with a first phase for registering the color signals from the photodetectors, followed by a second phase for filtering the color signals in accordance with the predetermined wavelengths and an evaluation phase for producing first and second detector signal sequences, and the evaluation unit is adapted at least to receive and evaluate the three color signals of the photodetectors in accordance with the predetermined wavelengths and to form a first sequence of the first detector signals for the first predetermined wavelength and a second sequence of the second detector signals for the second predetermined wavelength and by inversion of the second sequence and comparing with the first sequence the read-out information is checked for correct reading-off and authenticity in order to form a verified bit sequence, from the two sequences.

10. A reading arrangement as set forth in claim 9, wherein the detector arrangement is a charge coupled device.

11. A reading arrangement as set forth in claim 9, wherein a polarization filter is arranged as an analyzer between the optical imaging element and the detector arrangement.

12. A reading arrangement as set forth in claim 9, wherein the single lighting device comprises a linear arrangement of a plurality of light emitting diodes differing by virtue of the color of the emitted light and the light emitting diodes of the various colors are uniformly distributed in the linear arrangement and emit light simultaneously to provide the polychromatic light.

13. A reading unit for reading a document with an information strip comprising a reader arrangement as set forth in claim 9, and a plain text reader included for reading visually readable information of the document and/or a device for reading electronic data out of an IC-module of the document and/or a device for reading electronic data out of a magnetic strip of the document.

14. A reading arrangement comprising at least one detector arrangement arranged over a strip-shaped reading region in a reading plane end behind an optical imaging element, at least one lighting device arranged above the reading plane for completely illuminating the reading region from at least a first and second lighting direction and an evaluation unit for machine reading of said strip-shaped information strip with information optically encoded as a bit sequence which is disposed in the reading region of the reading plane, wherein a plane of symmetry is oriented parallel to an optical axis of the imaging element and intersects the imagine element, the detector arrangement comprising an at least one-line linear arrangement of photodetectors and the reading region centrally in the longitudinal direction, wherein the optical imaging element serves to produce an image of the entire reading region on photosensitive faces, which are oriented parallel to the reading plane, of photodetectors of the detector arrangement, there are provided at least a first and a second lighting device for lighting of the reading region, the emitted light of the lighting devices is substantially monochromatic and of the same color, the evaluation unit has a reading cycle with at least two reading phases, each reading phase differs from the preceding one by the direction of the light emitted by one of the lighting devices, the evaluation unit is adapted at least to receive and evaluate first detector signals of the photodetectors in the first reading phase and to receive and evaluate second detector signals of the photodetectors in the second reading phase in order to form a first and second sequence from the first detector signals and the second detector signals and by inversion of the second sequence and comparing with the first sequence the read-out information is checked for correct reading-off and authenticity, and wherein the evaluation unit is adapted to detect an element of the bit sequence out of the detector signals of at least three photodetectors arranged in a line in mutually juxtaposed relationship.

15. A reading arrangement as set forth in claim 14, wherein at least one of the lighting devices comprises a linear arrangement of a plurality of light emitting diodes and that the light emitting diodes emit light in at least the first and second lighting direction respectively.

16. A reading arrangement as set forth in claim 14, wherein two lighting devices are provided and arranged symmetrically with respect to the plane of symmetry.

17. A reading arrangement as set forth in claim 14, wherein the detector arrangement is a charge coupled device.

18. A reading arrangement as set forth in claim 14, wherein a polarization filter is arranged as an analyzer between the optical imaging element and the detector arrangement.

19. A reading unit for reading a document with an information strip comprising a reader arrangement as set forth in claim 14, and a plain text reader included for reading visually readable information of the document and/or a device for reading electronic data out of an IC-module of the document and/or a device for reading electronic data out of a magnetic strip of the document.

* * * * *

UNITED STATES PATENT AND TRADEMARK OFFICE
CERTIFICATE OF CORRECTION

PATENT NO. : 6,819,409 B1
DATED : November 16, 2004
INVENTOR(S) : Staub et al.

It is certified that error appears in the above-identified patent and that said Letters Patent is hereby corrected as shown below:

Title page,
Item [74], *Attorney, Agent, or Firm*, now reads "Hoffman & Baron, LLP"
should read -- Hoffmann & Baron, LLP --

Column 10,
Line 10, now reads "the first lighting direction a, the imaging element 3 (FIG. 1a)"
should read -- the first lighting direction α, the imaging element 3 (FIG. 1a) --
Line 65, now reads, "lighting direction ax, then a linear arrangement of light"
should read -- lighting direction α, then a linear arrangement of light --

Column 12,
Line 33, now reads "region 12 (FIG. 1a) at the lighting direction a does not have"
should read -- region 12 (FIG. 1a) at the lighting direction α does not have --

Column 16,
Line 51, now reads "imagine element, the detector arrangement comprising an at"
should read -- imaging element, the detector arrangement comprising an at --

Signed and Sealed this

Seventh Day of June, 2005

JON W. DUDAS
*Director of the United States Patent and Trademark Office*